United States Patent [19]

Ogawa

[11] 4,249,109
[45] Feb. 3, 1981

[54] LIGHT DIGITIZING CIRCUIT FOR AN ELECTRONIC FLASH DEVICE

[75] Inventor: Francis T. Ogawa, Jefferson County, Colo.

[73] Assignee: Rollei of America, Inc., Littleton, Colo.

[21] Appl. No.: 999

[22] Filed: Jan. 4, 1979

[51] Int. Cl.³ .................... H05B 41/32; G08C 9/06
[52] U.S. Cl. .................... 315/151; 250/214 DC; 315/159; 315/241 P; 340/347 M; 354/23 D; 354/33
[58] Field of Search .............. 315/151, 159, 241 P; 250/214 P, 214 DC; 354/23 D, 32, 33, 145; 340/347 M; 307/261, 311

[56] References Cited

U.S. PATENT DOCUMENTS

| | | | |
|---|---|---|---|
| 2,232,373 | 2/1941 | Dorst | 315/156 X |
| 3,269,287 | 8/1966 | Ost . | |
| 3,313,939 | 4/1967 | Spencer | 250/212 |
| 3,651,744 | 3/1972 | Okada | 250/214 P X |
| 3,783,336 | 1/1974 | Vital et al. | 315/159 |
| 4,035,814 | 7/1977 | Nobusawa | 354/23 D X |

FOREIGN PATENT DOCUMENTS 2510445  8/1976  Fed. Rep. of Germany .

*Primary Examiner*—Eugene R. LaRoche
*Attorney, Agent, or Firm*—Allegretti, Newitt, Witcoff & McAndrews

[57] ABSTRACT

Circuitry for digitizing received light into a digital pulsating signal, including a photodiode operable in response to light intensity for passing current to a capacitor for developing a voltage level thereacross. A voltage comparator with a hysteresis responds to the magnitude of the capacitor voltage level for tripping the comparator's output between a HIGH and LOW state which directs capacitor discharge to cycle the comparator output in a pulsating manner.

In a preferred embodiment, the circuitry is powered by a flash storage capacitor along a pair of conductors which serve both to power the circuitry and to receive pulsating current levels indicating voltage comparator switching. The current levels are sensed and counted for producing a binary count output of received light energy. In another embodiment, the conductors also serve to carry a trigger signal for directing flash initiation.

23 Claims, 8 Drawing Figures

START MONITORING LIGHT

LIGHT DIGITIZING CIRCUIT FOR AN ELECTRONIC FLASH DEVICE

BACKGROUND OF THE INVENTION

The invention relates to apparatus for calculating a total quantity of light received from a photographed scene and more particularly relates to circuitry for digitizing the light received into a pulsating electrical signal.

Electronic flash devices are known in the art in which the flash produced by a flash tube of the device is automatically terminated after a predetermined total quantity of light has been received from the photographed scene or subject. This is accomplished with the intention of causing the quantity of light reaching the film of the associated camera to be independent of the camera-to-subject distance.

Such devices have been primarily of the analog variety, however, the art has suggested the use of digital techniques to compute the total quantity of light received. The major difficulty with a digital light sensing technique is the conversion of light intensity to a proportional pulse rate since the light received is usually of short duration and large dynamic range causing errors in the conversion.

SUMMARY OF THE INVENTION

It is, therefore, an object of the present invention to provide an improved electronic flash apparatus which digitizes the amount of light received from a photographed scene in an accurate and reliable manner.

It is another object of this invention to provide a light digitizing circuit which is simple in construction and inexpensive to manufacture.

It is another object of this invention to provide an electronic flash apparatus having a light digitizing circuit which is interconnected to the remaining circuitry of the flash apparatus along only two conducting wires.

These and other objects of the invention are accomplished by sensing light, either in an ambient condition or a camera flash condition, and generating a signal having a magnitude representative of light intensity. The generated signal is transduced to a time period over which a predetermined magnitude of light energy has been received at the camera. The transducing is successively conducted and a pulse signal train is generated.

In a preferred embodiment of the invention, the light intensity signal is integrated by a capacitor which is repetitively charged and discharged for producing an output indicative of light energy. A high-speed CMOS voltage comparator with a hysteresis monitors the voltage level developed across the capacitor for determining the time period during which the predetermined quantity of light energy has been received. The discharging of the capacitor is controlled at a rate dictated by the light intensity signal for performing substantially continuous integration. In another preferred embodiment, the time period during a lack of integration is anticipated in order to eliminate error.

The light digitizing circuit is connectable to a pair of conductors which supplies power to drive the light digitizing circuit. The light digitizing circuit produces short duration pulses along the power conductors responsive to the predetermined magnitude of light energy being monitored by the digitizing circuit. The short duration pulses are monitored along the conductors and counted for terminating the flash of the device after a predetermined count has been reached. In a further embodiment the pair of conductors are also utilized for triggering the flash tube responsive to camera switch actuation.

DESCRIPTION OF THE PREFERRED EMBODIMENTS

Figure 1:
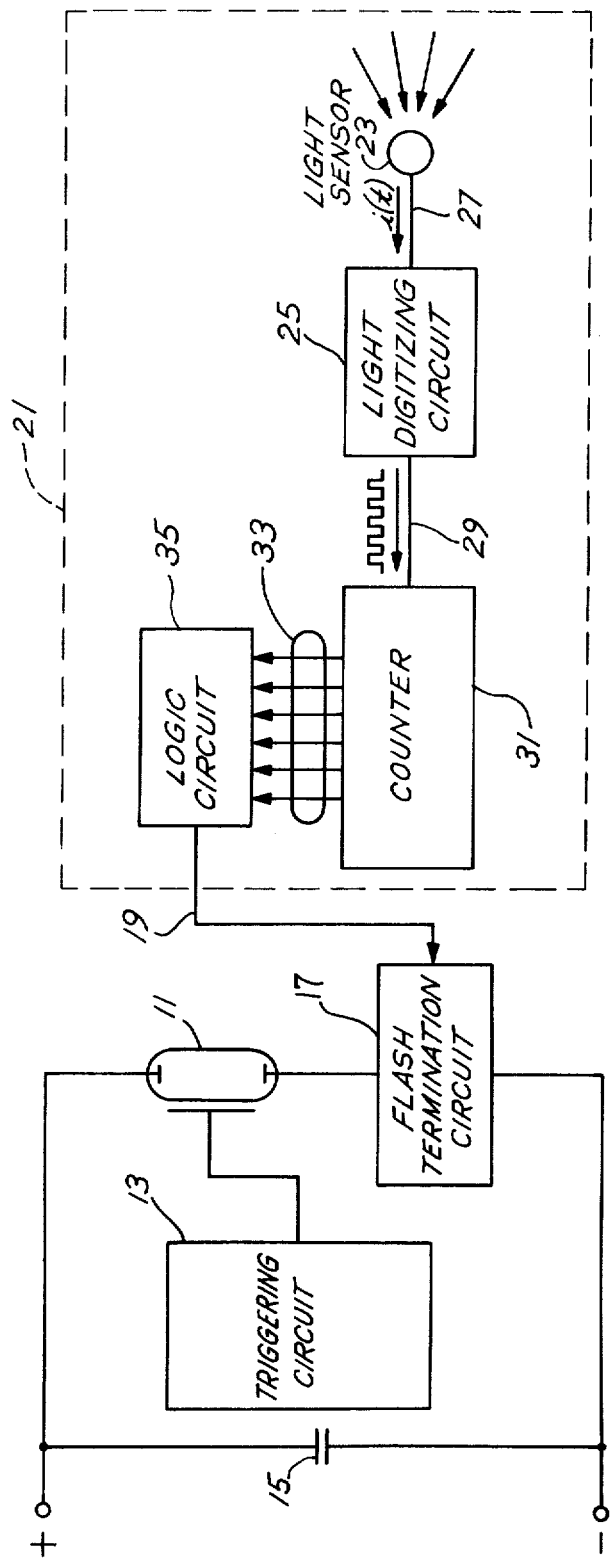
FIG. 1 is a general block diagram of an electronic flash embodiment of the present invention.

Referring to FIG. 1, a general block diagram is illustrated for explanation of the preferred embodiments. A conventional photographic flash tube 11 is actuated by a triggering circuit 13 responsive to a photographer depressing a camera switch (not shown) for photographing a desired subject or scene. A flash storage capacitor 15 serves to power the flash tube until a flash termination circuit 17 terminates the flash by opening an electronic switch connected in series with tube 11. The flash is terminated by termination circuit 17 responding to a control signal placed on lead 19 by a control circuit 21.

The purpose of control circuit 21 is to automatically terminate the flash after a predetermined quantity of light energy has been received from the subject or scene being photographed. Thus, the apparatus automatically controls the duration of the flash produced from the flash tube, as necessary to cause a predetermined quantity of light from the illuminated subject to fall on the film of an associated camera to provide proper exposure.

Control circuit 21 includes a light sensor 23 arranged to be exposed to light coming from the photographed scene which is illuminated by flash tube 11. Sensor 23 produces an output current i(t) having a magnitude related to the intensity of light received by sensor 23. The intensity of light received combined with the length of time that the intensity is produced, is related to the total quantity of light energy reaching the camera. The output current i(t) produced by light sensor 23 is fed to a light digitizing circuit 25 via lead 27 for transducing the current i(t) into a plurality of digital output pulses generated along output lead 29. Each pulse represents a discrete quantity of light energy received by light sensor 23.

A binary counter 31 is connected to output lead 29 for counting according to pulses produced along lead 29 and for generating a binary count output along leads 33. Since each pulse presented along output lead 29 substantially represents an equal quantity of light energy received at the light sensor in time, the total quantity of light energy received at the light sensor in time is represented by the binary count appearing on leads 33.

The binary count is fed to a logic circuit 35 which monitors the count output. When the count reaches a value indicative of the desired amount of light energy necessary for proper exposure of the film, the flash is terminated via control lead 19.

Figure 2:
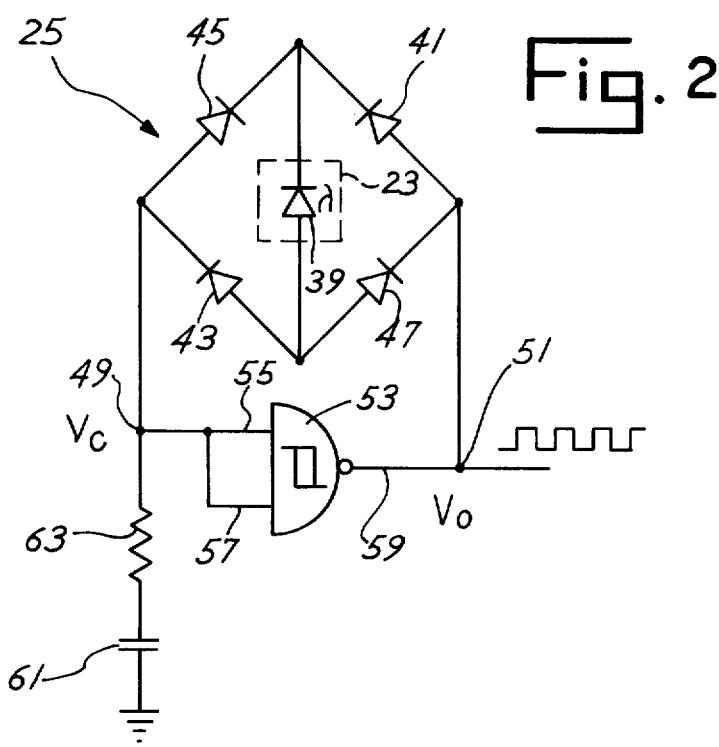
FIG. 2 is a circuit diagram of a preferred embodiment of a light digitizing circuit of the present invention.

Referring to FIG. 2, a preferred embodiment of the invention is illustrated in which light sensor 23 is formed of a photodiode 39 which operates to permit reverse current travel along its cathode-anode path according to the intensity of light impinging on the diode. When photodiode 39 is reverse biased, the magnitude of reverse current flowing through the photodiode is directly proportional to the light intensity incident thereon.

Photodiode 39 is interconnected with two pairs of diodes 41, 43 and 45, 47 for providing two separate reverse current paths through the cathode-anode junction of photodiode 39. Diodes 41, 43 provide a first current path from a circuit node 51 to a circuit node 49, and diodes 45, 47 provide a second current path from node 49 to node 51.

A Schmitt trigger 53 formed from a CMOS, CD4093 integrated circuit chip is interconnected across nodes 49, 51, placing the first and second current paths between the input and the output of Schmitt trigger 53. The Schmitt trigger includes a pair of input leads 55, 57 connected to node 49 and an output lead 59 connected to node 51.

Schmitt trigger 53 has an internal upper trip level $V_H$ and an internal lower trip level $V_L$, for producing a voltage output $V_O$ on output lead 59 according to the voltage level at its input leads 55, 57. When the voltage level at input leads 55, 57 increases to $V_H$, the voltage output $V_O$ goes LOW and remains LOW until the voltage level at input leads 55, 57 decreases to $V_L$, at which point $V_O$ goes HIGH. $V_O$ remains HIGH until the voltage level at input leads 55, 57 again reaches $V_H$.

As will be understood, a voltage comparator operating with a hysteresis may be used in place of Schmitt trigger 53.

A capacitor 61 and a resistor 63 are series-connected between node 49 and ground, for providing an input voltage $V_C$ to Schmitt trigger 53 according to the magnitude of charge stored on capacitor 61. The capacitor operates in a charging-discharging cycle in accordance with the voltage output $V_O$ appearing on output lead 59. When $V_O$ is HIGH, current is developed in the first current path through diodes 41, 39, 43 for charging capacitor 61. When $V_O$ is LOW, the second current path through diodes 45, 39, 47 serves as a discharge path for discharging capacitor 61. The voltage across capacitor 61 serves to trip the voltage output $V_O$ during the charging and discharging cycle of the capacitor.

Figure 3:
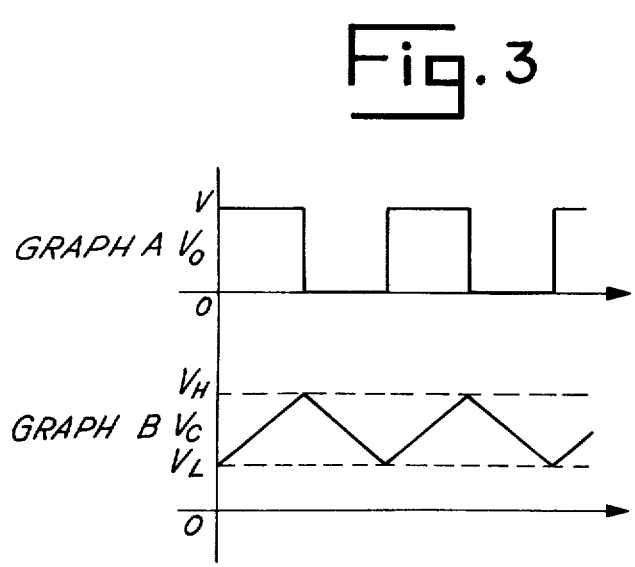
FIG. 3 is a graphical representation of selected voltage levels occurring in time, of the circuit of FIG. 2.

Referring to FIG. 3, Graph A illustrates the output voltage $V_O$ of Schmitt trigger 53. $V_O$ is either HIGH at a voltage V or LOW at substantially zero volts according to the input voltage $V_C$ shown in Graph B. When the Schmitt trigger produces a HIGH output, current flows through the first current path and charges capacitor 61 increasing the voltage $V_C$ as shown in Graph B. The rate of voltage increase for $V_C$ is dependent on the light intensity incident on photodiode 39.

When $V_C$ reaches $V_H$ volts, Schmitt trigger 53 switches to its LOW output as shown in Graph A. With $V_O$ at a LOW output, current flows through the second current path and discharges capacitor 61, decreasing the voltage $V_C$ as shown in Graph B. The rate of voltage decrease for $V_C$ is dependent on the light intensity incident on photodiode 39.

The resulting output waveform developed along output lead 59 is a train of pulses as shown in Graph A. The frequency of the pulse train will be a function of the light energy received at photodiode 39.

As capacitor 61 increases in charge, the capacitor serves to integrate the current signal flowing through photodiode 39 for developing a voltage across the capacitor representative of the time integral of the photodiode current. Because the time integral of light intensity yields total light energy received over the integrated time period, the magnitude of the voltage developed across the capacitor during capacitor charging is representative of the magnitude of light energy received at the photodiode, beginning at the start of capacitor charging.

This magnitude of voltage increase is monitored by Schmitt trigger 53 for maintaining the voltage output $V_O$ HIGH for a period of time until the represented magnitude of light energy reaches a predetermined magnitude, upon which $V_O$ goes LOW. Thus, the pulse width of each positive pulse of the pulse train on output lead 59 is indicative of a quantity of light energy.

An important feature of this invention resides in the discharging of capacitor 61 at a rate dependent on the light intensity incident on photodiode 39. Because of the integrating characteristics of capacitor 61, the magnitude of voltage decrease across the capacitor is representative of a magnitude of light energy received beginning at the start of capacitor discharge.

This magnitude of voltage decrease is monitored by Schmitt trigger 53 for maintaining the voltage output $V_O$ LOW for a period of time until the represented magnitude of light energy reaches a predetermined magnitude, upon which $V_O$ goes HIGH. Thus, the time between positive pulses of the pulse train on output lead 59 is indicative of a quantity of light energy. This serves to eliminate errors which would occur if the receipt of light energy between positive pulses was not taken into account.

The use of a CMOS device as a voltage comparator provides very fast switching which permits the pulse output of the comparator to be of a very small pulse width. This provides fine control of the flash duration time. Also, the CMOS Schmitt trigger provides a very high input impedance permitting substantially all of the photodiode current to charge and discharge capacitor 61.

A resistor 63 may be series-connected between capacitor 61 and node 49 for permitting the circuit to respond faster to high light levels, thus allowing the system to anticipate and correct error due to delays in terminating flash tube 11. The dynamic range of the circuit is a function of the dynamic range of photodiode 39 and the speed of Schmitt trigger 53.

Figure 4:
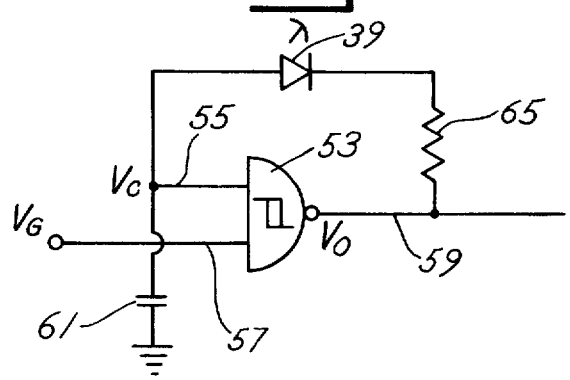
FIG. 4 is a circuit diagram of another preferred embodiment of a light digitizing circuit of the present invention.

Referring to FIG. 4, a second embodiment is illustrated which utilizes a CD4093, CMOS Schmitt trigger 53 having a pair of input leads 55, 57 and an output lead 59. A photodiode 39 is series connected with a resistor 65, between output lead 59 and input lead 55 of the Schmitt trigger. The photodiode is connected for providing a feedback circuit path from output lead 59 through its cathode-anode path to input lead 55. A capacitor 61 is connected between input lead 55 and ground for charging according to current passing through the feedback path to provide a voltage input to the Schmitt trigger.

When the voltage $V_O$ on the output lead 59 is HIGH, current is fed back through resistor 65 and through photodiode 39 charging capacitor 61. When $V_O$ is LOW, capacitor 61 discharges through resistor 65 via the forward biased junction of photodiode 39. The voltage across capacitor 61 is monitored by the input lead 55 of Schmitt trigger 53 for tripping the voltage input $V_O$ during the charging and discharging cycle of capacitor 61.

Figure 5:
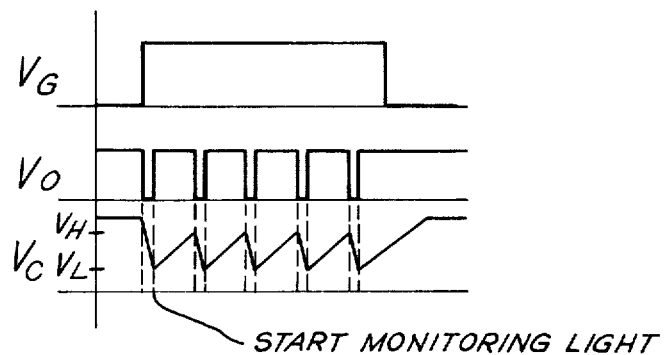
FIG. 5 is a graphical representation of selected voltage levels occurring in time, of the circuitry of FIG. 4.

A voltage $V_G$ on input lead 57 of the Schmitt trigger serves to initiate the pulsing output operation of the circuit. As shown in FIG. 5, when $V_G$ is LOW, $V_O$ is HIGH and capacitor 61 charges to $V_O$; the circuitry remains in its OFF condition with a constant HIGH output on lead 59.

$V_G$ is driven HIGH, preferably, immediately prior to flash initiation, for example, in response to camera switch actuation, in order to initialize the charge on capacitor 61, in order to begin monitoring light. When $V_G$ goes HIGH, $V_O$ goes LOW and discharges capacitor 61 rapidly to a voltage level $V_L$ (FIG. 5) initializing the charge on the capacitor and switching the output $V_O$ again to its HIGH state. Capacitor 61 then charges through photodiode 39 in reponse to light received until the voltage $V_C$ on capacitor 61 reaches a voltage $V_H$ which switches the output $V_O$ again to its LOW state, rapidly discharging capacitor 45 through the forward biased photodiode junction. The circuit continues cycling in this fashion producing a pulse train output having a frequency which is a function of the light energy falling on photodiode 39.

During rapid discharge of capacitor 61, a small error occurs since integration of light intensity does not take place during this time period. To compensate for this error, a third embodiment of the invention, as illustrated in FIG. 6, utilizes a separate charge and discharge path for capacitor 61.

Figure 6:
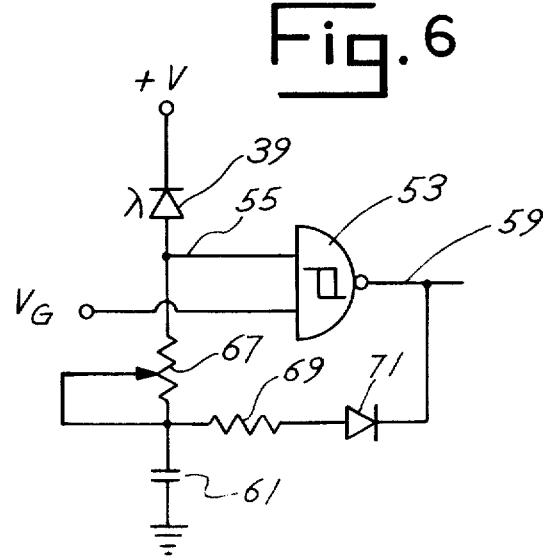
FIG. 6 is a circuit diagram of another preferred embodiment of a light digitizing circuit of the present invention.

Referring to FIG. 6, photodiode 39 has its cathode connected to a voltage source and its anode connected to input lead 55 of Schmitt trigger 53. Input lead 55 is connected to ground through a series connected circuit of a variable resistor 67 and capacitor 61. Capacitor 61 is charged through photodiode 39 and variable resistor 67 according to the light intensity falling on the photodiode.

A discharge path of a resistor 69 and diode 71, connects capacitor 61 to Schmitt trigger output lead 59, permitting capacitor 61 to discharge without discharge current flowing through variable resistor 67.

The voltage drop across variable resistor 67 is therefore added to the voltage drop across capacitor 61 in determining the switching voltage $V_H$ (FIG. 5) at input lead 55. Thus, light intensity would require less integration time due to the voltage added by variable resistor 67. This permits anticipation and compensation for the error caused due to lack of integration during capacitor discharge. The anticipation voltage increases directly as a function of light intensity falling on photodiode 39.

Figure 7:
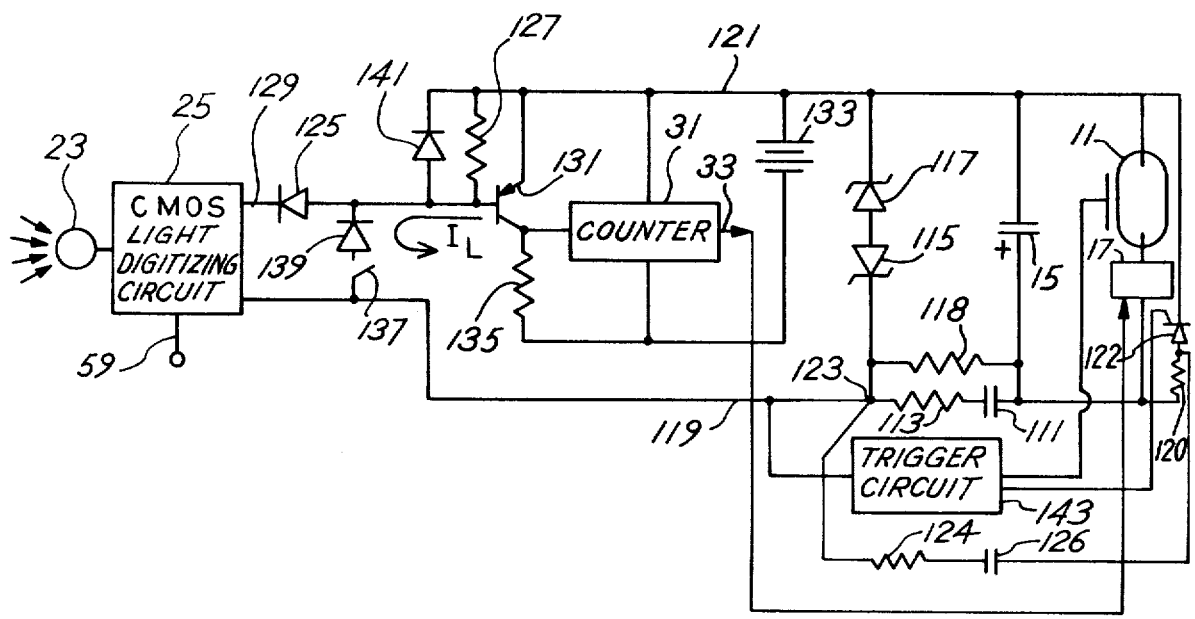
FIG. 7 is a circuit diagram of an electronic flash embodiment of the present invention.

Referring to FIG. 7, a preferred embodiment is illustrated of an electronic flash circuitry which utilizes light digitizing circuit 25, preferably CMOS, for terminating the electronic flash. The circuitry of FIG. 7 has an important feature of utilizing only two wires for carrying both the power to drive the circuit 25 and to receive pulsing signals produced by circuit 25. The two wires can also be utilized for triggering flash tube 11, responsive to actuation of a switch 137, as described hereinafter.

Flash tube 11 is connected in parallel with storage capacitor 15. Capacitor 15 is normally maintained in a charged state at a relatively high voltage, as for example, 350 volts. Also, connected in parallel with capacitor 15 is a series-connected circuit of a capacitor 111, a resistor 113, a zener diode 115 having its cathode connected to resistor 113, and a zener diode 117 having its anode connected to the anode of zener diode 115. A resistor 118 is connected across capacitor 111 and resistor 113 to provide current to zener diode 115.

Also, connected in parallel with capacitor 15 is a series-connected circuit of a resistor 120 and a SCR 122 whose anode is connected to resistor 120 and whose cathode is connected to the same side of capacitor 15 as the cathode of zener diode 117. A series-connected circuit of a resistor 124 and capacitor 126 connects the junction of SCR 122 and resistor 120 to a circuit node 123 lying at the junction of resistor 113 and zener diode 115. The gate of SCR 122 is connected to a trigger circuit 143 which performs conjoint actuation of SCR 122 and flash tube 11.

Preferably, SCR 122 is actuated immediately prior to the initiation of the flash of tube 11. Because tube 11 takes several microseconds to ionize, SCR 122 may be rendered conductive immediately prior to light being produced by tube 11. This permits the circuit to initialize prior to receipt of light from the flash.

Zener diode 117 serves as a voltage regulator for providing power to circuit 25 along a pair of conductors 119, 121. Conductor 119 connects circuit 25 to circuit node 123. Conductor 121 connects circuit 25 to the cathode of zener diode 117 via a diode 125 and a resistor 127; a lead 129 connects the CMOS circuit to the cathode of diode 125, the anode of which is connected to resistor 127.

Prior to actuation of flash tube 11, zener diode 115 maintains node 123 at a preset voltage and diode 125 decouples CMOS circuit 25 from conductor 121. The CMOS circuit, therefore, remains inoperative.

Prior to flash tube actuation, capacitor 111 is charged to the voltage of capacitor 15 less the voltage drop on zener diode 115. Upon actuation of SCR 122, capacitor 126 is connected via resistor 124 to line 121 causing current to flow through zener diode 117 according to the value of resistor 124. Additional current to line 119 is available from capacitor 111 via resistor 113, when the flash tube 11 discharges capacitor 15 to a voltage lower than that on capacitor 111.

The zener diode 117 regulates conductor 119 to a negative voltage level with respect to conductor 121, as for example, −15 volts. This voltage level is impressed across circuit 25 with a small current $I_L$ developed along conductor 121 through resistor 127 and diode 125.

Once power is delivered to CMOS circuit 25, output pulses are generated along its output line 59 according to the intensity of light received at light sensor 23. The operation of circuit 25 causes current spikes to be generated back into the power supply through the cathode-anode junction of diode 125 and resistor 127. In the FIG. 7 embodiment, these current spikes are sensed for flash termination instead of sensing the voltage output pulses produced along output lead 59. Output lead 59 may be left disconnected and floating, or may be connected through a capacitor to either lead 119 or 129 or connected through a resistor to lead 129, to increase the magnitude of the current spikes. As will suggest itself to those skilled in the art, the voltage pulses produced on line 59 could be used for sensing the produced pulse train if a third conductor was utilized to connect line 59 to pulse counting circuitry.

Figure 8:
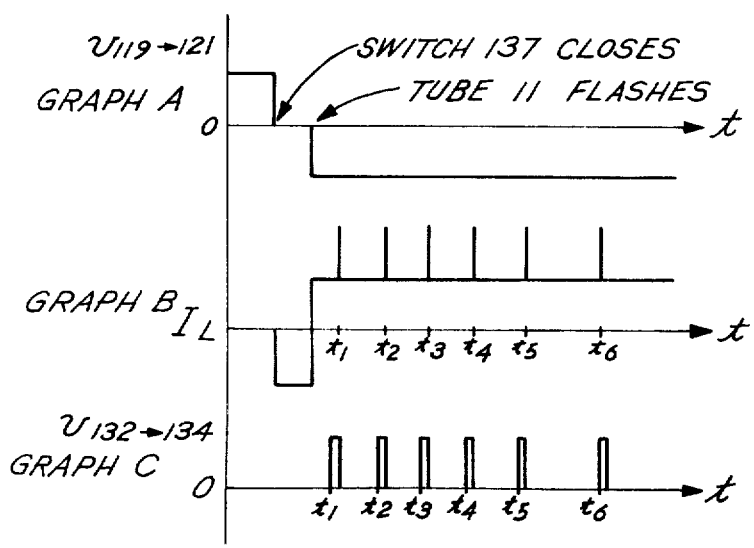
FIG. 8 is a graphical representation of select signal levels occurring in time, of the circuit of FIG. 7.

Referring to FIG. 8, Graph A illustrates the voltage waveform on conductor 119 with respect to conductor 121. Upon flash actuation, the voltage level on conductor 119 drops to a negative value and a small positive current $I_L$, as shown in Graph B, begins flowing to power circuit 25. As shown in Graph B, spikes are produced in the current which powers circuit 25 as circuit 25 switches from one state to the other.

In order to sense and count these current spikes, a transistor 131 is connected to circuit line 121 having its emitter-base path connected in parallel with resistor 127. The collector of transistor 131 is connected to the negative terminal of a battery 133 via resistor 135, and a counter 31 has its input connected across resistor 135 for counting according to the voltage level developed thereacross.

The current spikes travel both through resistor 127 and through the emitter-base junction of transistor 131 and cause transistor 131 to turn on momentarily. This causes a voltage spike to be impressed across resistor 135 between circuit nodes 132, 134 forming a counting pulse $V_{132\rightarrow 134}$ (Graph C, FIG. 8) which is counted by counter 31. The output from counter 31 is connected to flash termination circuit 17 for extinguishing flash tube 11 along line 33 upon output count reaching a predetermined value. As will suggest itself to persons skilled in the art, an inductor in parallel with a resistor may replace resistor 127 which will permit the circuit to operate at a much higher frequency. Also, diode 141 may be eliminated when using the inductor in parallel with a resistor.

Conductor 119 also may be used for triggering flash tube 11. Conductor 119 is normally maintained at a positive voltage level by zener diode 115 (Graph A, FIG. 8) while diode 125 decouples CMOS circuit 25 from the conductor.

Switch 137 is actuated responsive to the photographer taking a picture, which closes switch 137 shorting signal line 119 to the plus terminal of battery 133 through a pair of diodes 139, 141. Diode 139 connects switch 137 to a circuit node between diode 125 and resistor 127, and diode 141 is connected in parallel with resistor 127.

As represented in Graph A, FIG. 8, the closing of switch 137 drives conductor 119 to a relatively low voltage level, close to zero volts. Conductor 119 is monitored by trigger circuit 143 for triggering SCR 122 and flash tube 11 when the conductor drops to the relatively low voltage level. Triggering of SCR 122 and flash tube 11 results in conductor 119 driven negative, back biasing diodes 139, 141 for decoupling the bouncing switch signal of switch 137. Current $I_L$ begins to flow and power is supplied to CMOS circuit 25. Circuit 25 requires very little current when not switching and therefore transistor 131 remains off.

It should be understood, of course, that the foregoing disclosure relates to preferred embodiments of the invention and that other modifications or alterations may be made therein without departing from the spirit or scope of the invention as set forth in the appended claims.

What is claimed is:

1. A method using a sole light sensitive device for converting light received by the device into a digital pulsating signal, comprising the steps of:
    generating a signal using said sole sensitive device, having magnitude representative of the light intensity received by said device;
    transducing said signal to a time period over which said signal represents receipt of a predetermined magnitude of light energy;
    transducing said signal to a time period over which said signal represents receipt of a predetermined magnitude of light energy beginning from completion of said first named time period;
    performing successive repetitions of said last two named steps; and
    generating a pulse signal train responsive to said successive repetitions, including;
        (1) establishing the width of each successive pulse of said pulse train according to respective said first named time periods; and
        (2) establishing the time between successive pulses according to respective said second named time periods.

2. A method according to claim 1 wherein said steps of transducing said signal being performed so that said first named time period and said second named time period represent receipt of substantially equal magnitudes of light energy.

3. A light digitizing circuit for an electronic flash control device comprising:
    a sole light sensitive device arranged for exposure to light, for producing an output signal responsive to the intensity of light received;
    integrating means including a capacitor means connected for charging according to said output signal, said integrating means producing a voltage output representative of a quantity of light energy received at said light sensitive means;
    voltage level detector means having input hysteresis and connected for receiving said voltage output as an input, said detector having an output switching between a HIGH and a LOW output according to the voltage at its input; and
    discharge means responsive to the output of said detector means for affecting discharge of said capacitor means, and said light sensitive device controlling the rate of discharged of said capacitor means at a rate defined by said output signal.

4. A light digitizing circuit according to claim 3 and further including initializing means for presetting said capacitor means prior to flash initiation.

5. A light digitizing circuit according to claim 3 wherein said light sensitive device includes a first current path connected to said capacitor means for providing a unidirectional circuit path for said output signal to charge said capacitor means; and wherein said dumping discharge means includes a second current path connected between said light sensitive device and said capacitor means for providing a unidirectional circuit path for a discharge current from said capacitor means.

6. A light digitizing circuit according to claim 5 wherein said light sensitive device includes a third current path connected to the output of said detector means, said third current path for passing current determined by the output of said detector means, for producing said output signal along said first current path.

7. A light digitizing circuit for an electronic flash control device comprising:

light sensitive means arranged for exposure to light, for producing an output signal responsive to the intensity of light received;

integrating means including capacitor means connected in circuit with said light sensitive means for charging according to said output signal, said integrating means producing a voltage output representative of a quantity of light energy received at said light sensitive means;

Schmitt trigger means connected for receiving said voltage output as an input, said Schmitt trigger means switching between a HIGH and a LOW signal output according to the voltage at its input; and discharge means connected to said Schmitt trigger means for discharging said capacitor means according to the output of said Schmitt trigger means.

8. A light digitizing circuit according to claim 7 and further including initializing means for presetting said capacitor means prior to flash initiation.

9. A light digitizing circuit according to claim 7 wherein said integrating means includes anticipator means for increasing the voltage at the input of said Schmitt trigger means above the voltage developed across said capacitor means; and wherein said discharge means discharges the voltage developed across said capacitor means.

10. A light digitizing circuit according to claim 7 wherein said integrating means includes: a first current path connected between said light sensitive means and said capacitor means for providing a circuit path for said output signal to charge said capacitor means; anticipator means connected in said first current path for increasing the voltage at the input of said Schmitt trigger means above the voltage developed across said capacitor means, said anticipator means increasing the voltage at the input of said Schmitt trigger means to a magnitude determined by the magnitude of said output signal; and a second current path connected between said capacitor means and said discharge means for providing discharge current from said capacitor means.

11. A light digitizing circuit according to claim 7 wherein said Schmitt trigger means includes a CMOS Schmitt trigger.

12. A light digitizing circuit for an electronic flash control device comprising:

photodiode means arranged for exposure to light, for producing an output signal responsive to the intensity of light received;

integrating means including capacitor means connected for charging according to said output signal, said integrating means for producing a voltage output representative of a quantity of light energy received at said photodiode means;

voltage detector means having input hysteresis and connected for receiving said voltage output as an input, said detector means having an output electrically connected to the cathode of said photodiode, said detector means switching between a HIGH and a LOW signal output according to the voltage at its input; and discharge means electrically connected to said detector means for discharging said capacitor means according to the signal output of said detector means.

13. An electronic flash device comprising:
a pair of conductors;

a light digitizing circuit means connected for being powered from said conductors, said circuit means producing a short duration pulse along said conductors, representative of a magnitude of electrical energy monitored by said light digitizing circuit;

monitoring means connected to one of said conductors for sensing said pulse, said monitoring means producing an output indicative of a sensing of said pulse;

counter means counting according to said output and producing a count output; and means for generating a flash termination signal responsive to a predetermined magnitude of said count output.

14. An electronic flash device according to claim 13 wherein said monitoring means includes:

impedance means for passing current of said one conductor to said digitizing circuit means; and pulse generating means responsive to the voltage developed across the said resistance means for producing a pulse output.

15. An electronic flash device according to claim 14 wherein said impedance means is a resistor.

16. An electronic flash device according to claim 13 and further including:

flash tube means;

means for commanding actuation of said flash tube means;

voltage means for generating a voltage level across said conductors, said voltage means responsive to said commanding means.

17. An electronic flash device according to claim 16 wherein said voltage means generating a voltage level across said conductors prior to flash generation from said flash tube means.

18. An electronic flash device according to claim 16 wherein said voltage means is a capacitor, said capacitor for powering said conductors.

19. An electronic flash device according to claim 18 wherein said voltage means includes a zener diode.

20. An electronic flash device according to claim 19 and further including means for decoupling said voltage means from said conductors prior to actuation of said flash tube means.

21. An electronic flash device according to claim 13 and further including:

flash tube means;

means for developing a first voltage level across said conductors prior to actuation of said flash tube means;

means for decoupling said light digitizing means from said conductors prior to actuation of said flash tube means;

switch means manually actuable by an operator for commanding flash actuation;

means responsive to the actuation of said switch means for developing a second voltage level across said conductors; and means monitoring the voltage level developed across said conductors and for actuation of said flash tube means responsive to said second voltage level.

22. An electronic flash device according to claim 21 wherein said means responsive to the actuation of said switch means includes means for connecting said two conductors.

23. An electronic flash device according to claim 22 wherein said means for connecting includes means for decoupling said switch means from said conductors upon flash actuation.

* * * * *